(12) United States Patent
Grauerholz

(10) Patent No.: US 8,100,361 B2
(45) Date of Patent: Jan. 24, 2012

(54) HULL STRUCTURE

(75) Inventor: Thomas Grauerholz, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 713 days.

(21) Appl. No.: 12/331,833

(22) Filed: Dec. 10, 2008

(65) Prior Publication Data
US 2009/0159746 A1 Jun. 25, 2009

Related U.S. Application Data

(60) Provisional application No. 61/008,402, filed on Dec. 20, 2007.

(51) Int. Cl.
B64C 1/00 (2006.01)

(52) U.S. Cl. .............. 244/119; 244/123.1; 244/123.14; 244/123.2; 244/123.8; 244/123.9

(58) Field of Classification Search .............. 244/117 R, 244/119, 120, 123.1, 123.14, 123.2, 123.8, 244/123.9
See application file for complete search history.

(56) References Cited

U.S. PATENT DOCUMENTS

| 3,867,244 | A  | * | 2/1975  | Adams            | 244/119 X    |
|-----------|-----|---|---------|------------------|--------------|
| 3,962,506 | A  | * | 6/1976  | Dunahoo          | 244/123.14 X |
| 4,025,996 | A  | * | 5/1977  | Saveker          | 244/123.1 X  |
| 4,635,882 | A  | * | 1/1987  | SenGupta et al.  | 244/119      |
| 4,786,015 | A  | * | 11/1988 | Niggemann        | 165/184 X    |
| 4,916,027 | A  | * | 4/1990  | DelMundo         | 244/119 X    |
| 5,165,627 | A  | * | 11/1992 | Amano et al.     | 244/119      |
| 5,472,760 | A  | * | 12/1995 | Norvell          | 244/119 X    |
| 5,611,504 | A  | * | 3/1997  | Haynes et al.    | 244/119      |
| 6,655,633 | B1 | * | 12/2003 | Chapman, Jr.     | 244/123.9    |
| 6,676,077 | B1 | * | 1/2004  | DiChiara et al.  | 244/117 R    |
| 6,746,755 | B2 | * | 6/2004  | Morrison et al.  | 244/123.14 X |
| 7,074,474 | B2 | * | 7/2006  | Toi et al.       | 244/119 X    |
| 7,210,611 | B2 | * | 5/2007  | Sanders et       | 244/117 X    |
| 7,293,737 | B2 | * | 11/2007 | Engwall et al.   | 242/590      |
| 7,530,530 | B2 | * | 5/2009  | Engwall et al.   | 244/119      |
| 7,861,969 | B2 | * | 1/2011  | Guzman et al.    | 244/120      |
| 7,871,040 | B2 | * | 1/2011  | Lee et al.       | 244/119      |
| 2003/0042364 | A1 | * | 3/2003 | Tanaka et al.    | 244/123      |
| 2005/0211838 | A1 | * | 9/2005 | Struve et al.    | 244/119      |
| 2005/0211839 | A1 | * | 9/2005 | Movsesian et al. | 244/119      |
| 2005/0211843 | A1 | * | 9/2005 | Simpson et al.   | 244/119      |
| 2005/0230552 | A1 | * | 10/2005 | Engwall et al.  | 244/133      |
| 2007/0095982 | A1 | * | 5/2007 | Kismarton et al. | 244/119      |
| 2007/0102839 | A1 | * | 5/2007 | McGowan et al.   | 244/119 X    |
| 2008/0029644 | A1 | * | 2/2008 | Martinez Cerezo et al. | 244/119 |
| 2008/0111024 | A1 | * | 5/2008 | Lee et al.       | 244/119 X    |
| 2008/0290214 | A1 | * | 11/2008 | Guzman et al.   | 244/119      |
| 2009/0194636 | A1 | * | 8/2009 | Childs           | 244/123.8    |
| 2009/0283638 | A1 | * | 11/2009 | Rodriguez et al. | 244/119     |
| 2010/0230542 | A1 | * | 9/2010 | Childs           | 244/123.1    |
| 2010/0318243 | A1 | * | 12/2010 | Lewis et al.    | 244/119 X    |
| 2010/0320319 | A1 | * | 12/2010 | Liguore et al.  | 244/119      |
| 2011/0073708 | A1 | * | 3/2011 | Biornstad et al. | 244/119 X   |

* cited by examiner

Primary Examiner — Rodney B White
(74) Attorney, Agent, or Firm — Jenkins, Wilson Taylor & Hunt, P.A.

(57) ABSTRACT

A hull structure is provided, for use in particular in an aircraft or spacecraft, the hull structure including an outer skin and structural components which are connected to said skin, as well as an inner lining which forms a supporting structure together with the outer skin and the structural components.

17 Claims, 1 Drawing Sheet

HULL STRUCTURE

CROSS-REFERENCE TO RELATED APPLICATIONS

This application claims the benefit of U.S. Provisional Application No. 61/008,402, filed Dec. 20, 2007, the entire disclosure of which is herein incorporated by reference.

FIELD OF THE INVENTION

The present invention relates to a hull structure which may be used, for example, in the construction of aircraft or in the field of space travel.

BACKGROUND OF THE INVENTION

Generally, the hulls of modern commercial aircraft comprise a hull arrangement which consists of an outer skin and an inner skin as well as structural components. The structural components, for example stringers or formers, are connected to the respective skin, in particular to lend a high level of stability to the hull, and form a supporting construction having transverse and longitudinal struts, which supports the outer skin. These units, also known as shells, are subsequently connected to form panels or tubular portions. In a further assembly, these units together form the pressure hull. Furthermore, the inner skin is provided with a lining, the lining comprising, for example, additional arrangements, such as luggage compartments which are arranged above the heads of passengers, i.e. head racks.

However, hulls of this type have the drawback that they are relatively expensive to produce and assemble since the supporting construction or primary structure of the hull is formed of an outer skin and an inner skin as well as structural components. A lining, for example for the passenger space, must also be provided on the inner skin. However, the lining has no function with regard to providing support. This construction also has the drawback that it is relatively heavy due to the large number of components involved.

Although they can be applied to any type of hull and other components, the present invention and the problem on which it is based are explained in greater detail with reference to a hull of a commercial aircraft.

SUMMARY OF THE INVENTION

An object of the invention is therefore to provide an improved hull structure which is lighter and is also constructed so as to be more compact.

According to the invention, a hull structure having the features of claim 1 is provided.

Accordingly, a hull structure, for use in particular in an aircraft or spacecraft, is provided, the hull structure comprising an outer skin and structural components which are connected to said outer skin, as well as an inner lining which forms a supporting structure together with the outer skin and the structural components.

One idea upon which the invention is based consists of using the inner lining not just as a screen, but also to form part of the primary structure, i.e. as a supporting structure.

This is achieved by producing a hull structure which consists of the outer skin, the lining and interposed structural components, such as stringers and formers. The lining is thus connected directly to the structural components.

Consequently, the invention makes it possible to use the inner lining as a supporting structure, it being possible to dispense with an additional supporting inner skin. As a result, a considerable amount of weight can be saved and production and assembly costs can be reduced.

Further embodiments and developments of the invention will emerge from the sub-claims as well as from the description with reference to the drawings.

According to a development of the invention, the structural components, such as stringers and formers, comprise a hollow profile, for example an omega and/or Y-shaped hollow profile. However, any other type of hollow profile may also be envisaged. A hollow profile of this type has the advantage of providing improved structural integrity.

In a further embodiment according to the invention, a wiring system, for example consisting of one or more lines, is fed through in the hollow profile. This has the advantage that the lines are not fed into the hull structure, as was previously the solution. Furthermore, the hollow profiles may provide additional integrity.

According to a further embodiment according to the invention, as wiring, the wiring system comprises, for example, electrical lines and/or cables for conveying liquid or gaseous media. In this case, for example, air from the air-conditioning system and from the ventilation, may be fed through a respective line. In principle, it is also conceivable to convey the air directly through the hollow profile, i.e. without providing for this purpose a line, such as a hose, which is fed through the hollow profile.

In another embodiment according to the invention, the wiring system or parts of the wiring system is/are surrounded by a hose or a fabric. The hose and/or fabric may substantially surround the wiring system over the entire length thereof or may surround at least one or more portions thereof. The hose and/or fabric are, for example, configured so as to be resilient or at least resilient in part. This embodiment has the advantage that the hose or the fabric hold together and also stabilise the wiring system consisting, for example, of a plurality of lines in such a way that lines cannot become tangled together so easily for example. The hose or the fabric may, for example, be formed of a composite material, such as CFRP, AFC, GFRP, GLARE and/or HSS-GLARE, it being possible to achieve a specific level of flexibility of the composite material if it is formed as a fabric.

According to a further embodiment according to the invention, at least one device is provided for measuring signal propagation times in the wiring systems. The signal propagation times are, in this case, analysed and also optionally recorded. This has the advantage that it can be determined, for example on the basis of the signal propagation times, whether the hull of the aircraft is expanding or contracting, for example. Conclusions may be drawn from this information, for example regarding maintenance intervals.

In a further embodiment according to the invention, the hollow profile is provided on the inside and/or outside with suitable insulation. This has the advantage that the hollow profile may be insulated on the inside and/or outside in accordance with the type of wiring system fed into the hollow profile. Thus, lines, for example for the air-conditioning system, or other assemblies may be fed through, in which case warm or hot liquid or gaseous media may be fed into the lines. These lines may be suitably insulated themselves or by the insulation of the hollow profile.

In another embodiment according to the invention, the outer skin, the structural components and/or the lining consist of at least one or more composite materials, such as CFRP, GFRP, AFC, GLARE and/or HSS-GLARE. In particular, components made of CFRP and GLARE have the advantage that they are highly stable and, at the same time, are lightweight.

According to a further embodiment according to the invention, the outer skin, the structural components and/or the lining may also comprise a metal or a metal alloy, for example made of aluminium, steel and/or titanium. Alternatively, the aforementioned components may also comprise a combination of metal or a metal alloy and at least one or more composite materials, such as CFRP, GFRP, AFC, GLARE and/or HSS-GLARE. The materials are, in this case, combined according to specific factors, for example weight, stability, corrosion, etc.

BRIEF DESCRIPTION OF THE DRAWINGS

The invention will be explained in greater detail hereinafter with reference to embodiments referring to the accompanying figures of the drawings, in which.

In the figures, like reference numerals refer to like or functionally similar components unless information to the contrary is given.

DETAILED DESCRIPTION OF THE INVENTION

Figure 1:
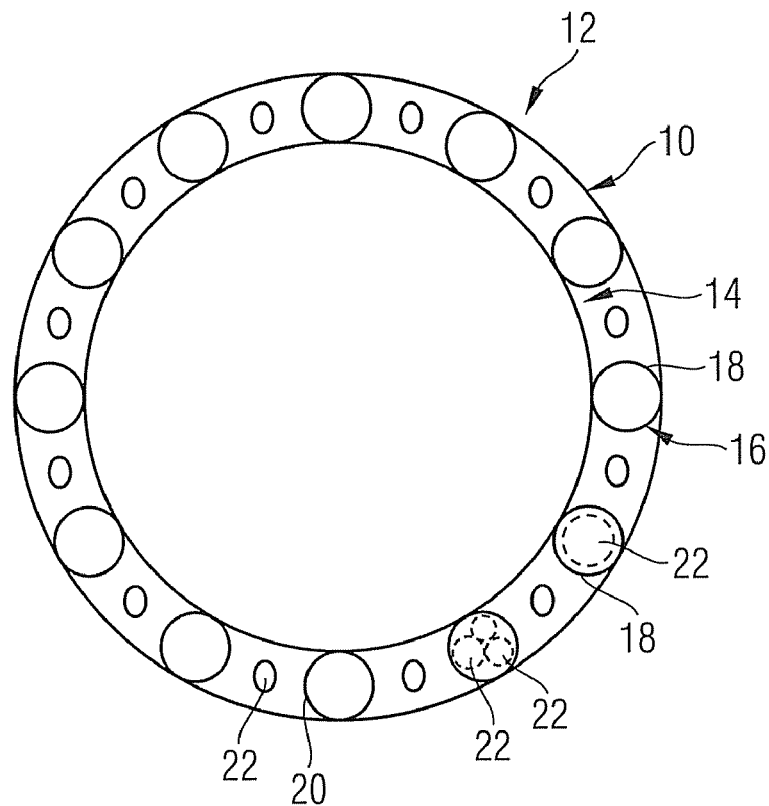
FIG. 1 is a schematic cross-section of a hull structure according to the invention.

In FIG. 1, a hull structure 10 according to the invention is shown in cross-section. The illustration in FIG. 1 is purely schematic and highly simplified. It is shown substantially in order to explain the principle according to the invention.

In this case, the hull structure 10 according to the invention comprises an outer skin 12. Furthermore, according to the invention the lining 14 forms part of the primary structure or the supporting structure in such a way that, for example contrary to the state of the art, an additional supporting inner skin may optionally be forgone. The inner lining 14 is connected to the associated structural components 16, such as stringers 18 and formers (not shown), as a supporting structure for example. The inner lining 14 may, in this case, comprise one or more composite materials, such as CFRP, GFRP, AFC, GLARE and/or HSS-GLARE. Alternatively, the inner lining 14 may also comprise metal or a suitable metal alloy, or a combination of at least one or more composite materials with a metal or a metal alloy.

The structural components 16 are initially fixed to the skin 12, for example. For this purpose, they may be fixed, for example, via rivets, screws, adhesion and/or welding, etc. Furthermore, additional connection elements (not shown), such as clips and/or cleats, may be used to fix stringer 18 and formers.

The lining 14 may also, as a supporting structure, for example, be fixed by adhesion to the structural components 16 and/or to the outer skin 10. For example, the inner lining 14 may be glued onto the inner flange faces of formers. In principle, as well as adhesion and in addition thereto, rivets, screws and/or welding, etc., may be used to fix the lining 14 and the structural components 16.

Hollow profiles 20, such as omega or Y-shaped profiles or any other type of hollow profile may be used for the structural components 16, such as stringers 18 and formers. The hollow profiles 20, in particular for the stringers 18, may in this case, according to the invention, also be used to convey system lines 22 or as electrical routes, for example for flight control or for controlling equipment, etc. In this case, a system line 22 or even more than one system line or a plurality thereof, as is shown in FIG. 1 with a dashed line, may be fed in a hollow profile 20. The dimensions of the system lines 22 and hollow profiles 20 as well as the inner lining 14 and the skin 12 are shown purely schematically in FIG. 2 and are not drawn to scale.

The system lines 22 may, for example, also be provided with a hose or a fabric (not shown), for example made of a composite material, such as CFRP, GFRP, AFC, GLARE and/or HSS-GLARE. The hose or the fabric may, in this case, be configured so as to be resilient or at least resilient in part, the fabric structure already being able to provide some level of resilience.

Figure 2:
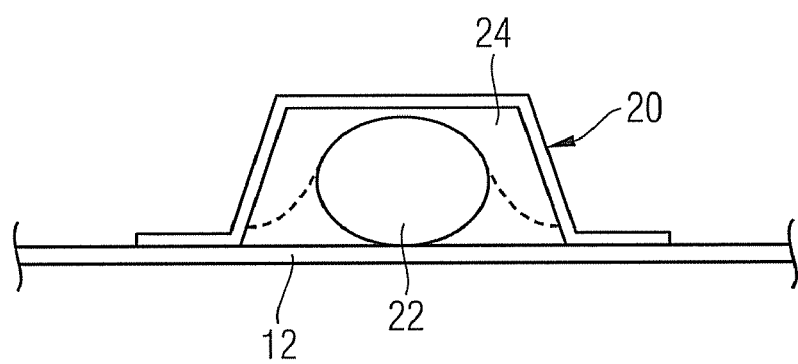
FIG. 2 is a schematic sectional view through a hollow profile according to the invention.

As is shown in FIG. 2, the respective hollow profile may optionally be provided with additional insulation 24. The insulation 24 is shown in FIG. 2 with a dashed line. Alternatively or in addition, the system line 22 may also be provided itself with suitable insulation 24 (not shown). The insulation 24 may, depending on the type of line or the position of the system line, be selected in order to protect the system line and/or the area surrounding said system line from undesirable developments of hot or cold temperatures. The insulation 24 may be arranged inside the hollow profile 20, as is shown in FIG. 2, and/or outside the hollow profile 20. Alternatively or in addition, the corresponding system line 22 may also be provided with insulation (not shown) or the system lines 22 may be provided with an outer insulating casing.

This arrangement of the system lines 22 has the advantage that, in order to solve the problem posed, the system lines 22 are no longer arranged in the hull or only some of the lines, as shown in FIG. 1, are arranged in the hull. Furthermore, by arranging some of the system lines 22 or substantially all the lines inside the hollow profiles 20, the supporting structure can be additionally strengthened.

Furthermore, an aircraft may optionally be provided with an appropriate device or devices for determining or measuring, analysing, and displaying or recording signal propagation times, which devices analyse signals or some of the signals that are conveyed through the system lines 22, in this case electrical lines.

It can be deduced from the signal times of electrical lines, which, for example, are arranged in hollow profiles 20 of the stringers 18 and extend at least through one or more regions or substantially along the entire hull, whether the hull is expanding or contracting, for example. These recordings of signal times may be used for maintenance recordings and, for example, for determining maintenance intervals. Consequently, suitable maintenance intervals can be determined for each aircraft individually, said intervals previously being established in the state of the art generally for the respective type of aircraft based on models.

As a result, longer maintenance intervals can be established, for example in the case of aircraft, if it is established that an aircraft has had, for example, a lower number of hard landings than is otherwise assumed in the aforementioned models in the sector for aircraft. Consequently, highly realistic maintenance intervals can be established overall. The invention is, however, not limited to this use of data in relation to signal propagation times, and these data may be used in principle for a plurality of further applications.

In addition to system lines 22 and electrical routes, the hollow profiles 20, in particular the stringers 18, may also be used as part of the air-conditioning or ventilation systems or the like. In this case, air may be correspondingly conveyed via the hollow profiles 20. For this purpose, additionally corresponding tubes or hoses (not shown) may optionally act as system lines 22 which are arranged in the hollow profiles 22, through which the air or any other liquid or gaseous medium is conveyed. The tubes or hoses may optionally also be provided with suitable insulation in order to prevent undesired developments of hot or cold temperatures in the tube or hose and/or the surroundings thereof. Alternatively or in addition, as described above, the hollow profile 20 itself may also be insulated.

The construction plan of a straw is reproduced in this principle of construction, according to the invention, of hull shells with stringers 18.

In this case, a double ring structure of stringers 18 made of a fibrous material, as already mentioned above, for example a composite material, such as CFRP, AFC, GFRP, GLARE and/or HSS-GLARE, is provided, the stringers being arranged like straws along the outer skin 12 and the inner lining 14. The double ring structure may be produced in the form of the hollow profiles 20 described above, which are fixed to the outer skin 10 and to the inner lining 14.

This skin-stringer structure is, in this case, particularly suitable for hull skins made of GFRP and CFRP and stringers made of GFRP or CFRP.

In this case, one advantage is the increased rigidity and the advantageous resistance to damage of a construction of this type. Further advantages are offered by the integrated inner lining 14. The lining 14 in this case does not only act purely as a screen, as was the case previously in the state of the art, but forms part of the primary structure or the supporting structure according to the present invention. The rigidity of this lining 14 is not currently used in the state of the art. In the case of the hull structure 10 according to the invention, the inner linings 14, such as dado panels, window panels and ceiling panels, etc., form part of the supporting primary structure, making it possible to forego a separate inner skin, at least in part or else completely. Consequently, a considerable amount of weight can be saved and production and assembly costs can be reduced.

Although the present invention was described with reference to preferred embodiments, it is not limited to these embodiments and may be modified in various ways.

What is claimed is:

1. Hull structure, for use in particular in an aircraft or spacecraft, the hull structure comprising an outer skin and structural components connected to said outer skin as well as an inner lining which forms a supporting structure together with the outer skin and the structural components;
    wherein the structural components are fixed to the outer skin and the lining is fixed to the structural components by one or more of adhesion, rivets, screws, or welding; and
    wherein the lining and the structural components comprise at least one or more of composite materials, a metal, a metal alloy, or a combination of composite materials and a metal or metal alloy.

2. Hull structure according to claim 1, wherein the structural components comprise stringers and formers, the stringers and/or formers being configured as a hollow profile.

3. Hull structure according to claim 2, wherein the hollow profiles and/or the system lines are provided with suitable insulation on the inside and/or outside.

4. Hull structure according to claim 2, wherein the stringers and/or formers are configured as an omega and/or Y-shaped hollow profile.

5. Hull structure according to claim 1, wherein system lines, for example, can be fed through at least some or all of the hollow profiles.

6. Hull structure according to claim 5, wherein the system lines comprise electrical lines and/or cables for conveying liquid or gaseous media.

7. Hull structure according to claim 5, wherein the system lines are surrounded by a tube and/or a fabric at least in at least one or more portions or substantially over the entire length, the tube and/or the fabric being configured so as to be resilient or at least resilient in part.

8. Hull structure according to claim 7, wherein the tube and/or fabric comprise at least one or more composite materials, such as CFRP, GFRP, AFC, GLARE and/or HSS-GLARE.

9. Hull structure according to claim 1, wherein at least one device for measuring signal propagation times in the system lines is provided.

10. Hull structure according to claim 9, wherein the signal propagation times are recorded.

11. Hull structure according to claim 1, wherein the outer skin, the structural components and/or the lining consist of at least one or more composite materials, such as CFRP, GFRP, AFC, GLARE and/or HSS-GLARE.

12. Hull structure according to claim 1, wherein the outer skin, the structural components and/or the lining comprise a metal or a metal alloy, or consist of a combination of metal or a metal alloy and at least one or more composite materials, such as CFRP, GFRP, AFC, GLARE and/or HSS-GLARE.

13. Hull structure according to claim 12, wherein the outer skin, the structural components and/or the lining comprise a metal or a metal alloy, made of aluminum, steel, and/or titanium.

14. Hull structure according to claim 1, wherein the lining is fixed to the structural components by means of adhesion, rivets, screws and/or a welding.

15. Aircraft having at least one hull structure according to claim 1.

16. Aircraft according to claim 15, wherein the aircraft comprises a measuring, recording and analysing device for measuring, recording and analysing the signal propagation time of signals sent through system lines, for example in hollow profiles.

17. Aircraft according to claim 16, wherein a maintenance cycle for the aircraft is determined or adjusted based on the signal propagation times.

* * * * *